United States Patent [19]
Keith

[11] 3,929,270

[45] Dec. 30, 1975

[54] FILM-SURFACE WELDING BACKUP TAPE

[75] Inventor: Roger H. Keith, Ramsey, Minn.

[73] Assignee: Minnesota Mining and Manufacturing Company, St. Paul, Minn.

[22] Filed: July 17, 1974

[21] Appl. No.: 489,143

[52] U.S. Cl. .............................. 228/50; 228/216
[51] Int. Cl.² .................................... B23K 5/22
[58] Field of Search ........... 29/491; 228/50, 56, 57, 228/59, 216; 161/185, DIG. 5

[56] References Cited
UNITED STATES PATENTS

| | | | |
|---|---|---|---|
| 3,326,741 | 6/1967 | Olson | 117/68 |
| 3,388,027 | 6/1968 | Altman | 161/DIG. 5 |
| 3,413,168 | 11/1968 | Danielson et al. | 156/71 |
| 3,418,896 | 12/1968 | Rideout | 161/DIG. 5 |
| 3,494,020 | 2/1970 | Cornell | 29/491 |
| 3,846,221 | 11/1974 | Golec | 161/DIG. 5 |

*Primary Examiner*—Donald G. Kelly
*Assistant Examiner*—Margaret Joyce
*Attorney, Agent, or Firm*—Alexander, Sell, Steldt & DeLaHunt

[57] ABSTRACT

Welding backup tape comprising a strip of flexible refractory material medially adhered along the length of tape backing is improved by surfacing the flexible refractory with a heat-curing adhesive film. Preferably, a layer of inorganic particles is disposed on the surface of the heat-curing film. The resulting improved tape material retains its coherent structure even when preheated to temperatures of 150°C. or higher for extended periods of time.

3 Claims, 2 Drawing Figures

U.S. Patent Dec. 30, 1975 3,929,270
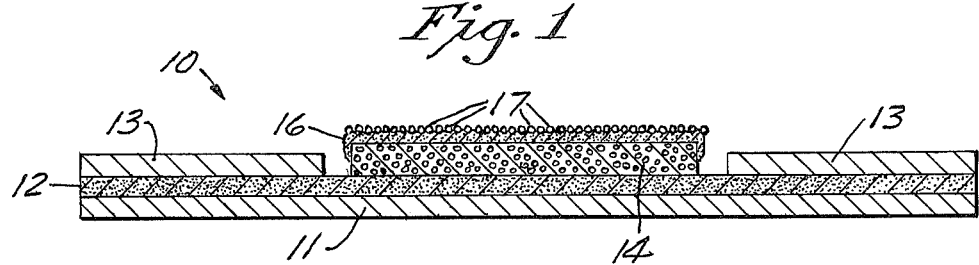
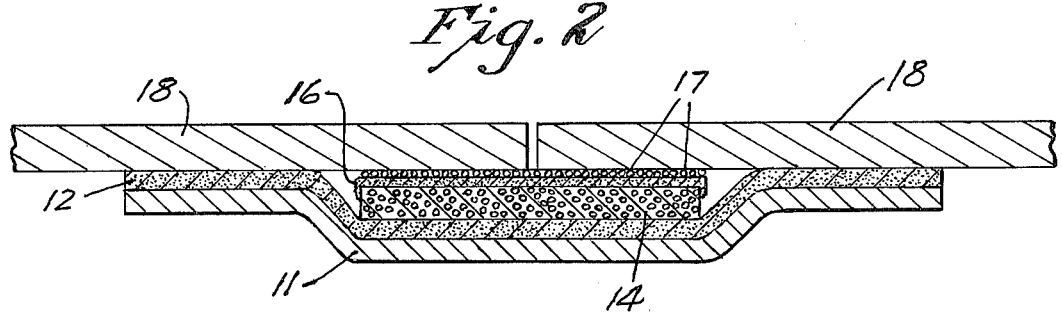

FILM-SURFACE WELDING BACKUP TAPE

BACKGROUND OF THE INVENTION

1. Field Of The Invention

This invention relates to improved flexible tapes useful as a backing means for the fusion welding of metals. More particularly, this invention relates to an improved flexible welding backing tape useful where the material to be fusion welded must be preheated.

2. Prior Art

In the formation of fusion-welded metal articles, particularly where the weld joint extends through a thick material, it is conventional to weld or clamp a heavy steel backup bar in place to support the weld bead and lay down the bead in two or more weld passes.

The welding process causes localized heating and cooling in the materials joined, which in turn produces (1) internal stresses, (2) distortion or warpage, and (3) coarse and variable grain size, each of which lowers the strength of the weld. The problems are particularly acute when the pieces to be joined are 20 millimeters (¾ inch) thick or greater. Without proper preheating, the multiple passes used in joining such pieces creates a stress in the weld bead where the center portion is in compression and the surfaces are in tension. In order to prevent internal stress, warpage or grain size problems during the actual welding, it is common to preheat the assembly, e.g., to 150°–200°C. for from several minutes to several hours. After the weld material has been deposited, the bar is removed by chipping and grinding, a difficult and time-consuming process. The joint is then repaired and finished by welding any cracks which are present on the side formerly in contact with the bar. This repair operation often requires the welder to operate in cramped, awkward positions while the work piece is still hot, e.g., at 115°–150°C.

To eliminate the bar removal problems and produce a sounder weld on the backup side, a flexible welding backup tape has been used as a replacement for the metal backup bars. One example of a useful backup tape is described in U.S. Pat. No. 3,372,852. This tape is formed by coating a flexible, heat resistant backing of glass cloth, metal foil or the like with adhesive and adhering a strip of flexible heat-resistant refractory material to the central portion of the backing. The flexible refractory comprises inorganic particles bonded together with a minor amount of a flexible organic binding. U.S. Pat. No. 3,494,020 discloses a welding backup tape related to U.S. Pat. No. 3,372,852 but additionally containing a carbon scavenger which prevents an increase in the carbon content of the weld metal due to decomposition of organic materials present.

These flexible backup tapes can be applied over one side of a joint to be welded where they readily conform to the shape of the metal articles to be joined. The refractory strip supports the molten weld material as it is deposited during the welding operation, allowing production of a smooth-surfaced, one-pass weld. These tapes substantially eliminate the need for grinding and welding the backup side to form a smooth, sound weld.

Where a backup tape is used as in the welding of thick material, e.g., greater than 20 millimeters (¾ inch) thick, the preheating is carried out with the tape in position. While the prior art tapes easily take the high temperature momentarily generated by an electric arc and hold the molten weld material in place until it begins to solidify (a period of 5–10 seconds), they have not been designed to endure extended periods of preheating, and the binder in the flexible refractory tends to decompose if preheated, resulting in disintegration of the flexible refractory layer. This causes an irregular surface on the weld bead in contact with the tape or even inclusion of inorganic particles in the weld. While these tapes provide a better weld than the backup bars previously used, the occasional defects require repair and have caused some concern, especially where the welds are in high strength structural or pressure vessel applications.

SUMMARY OF THE INVENTION

The present invention provides a welding backup tape which retains all the advantages of the prior art tape but which minimizes or eliminates the inclusion of refractory inorganic particles in the weld joint.

The welding backup tape of this invention is similar to that presently used by the art, having a thin, flexible backing, e.g., metal foil or glass cloth coated with acrylic, or other pressure-sensitive adhesive. Along the median of the tape there is disposed a strip of flexible refractory material which comprises refractory particles bound together with an elastomeric resin. These refractory particles have an effective diameter of about 50–4000 microns, the binder generally representing less than about 10 percent of the strip by volume. The tape can incorporate a carbon scavenger, e.g., ammonium nitrate to react with carbon generated by decomposition of any organic materials present. Further information with respect to backings, adhesive, flexible refractory components and methods for making welding backup tape can be found in U.S. Pat. No. 3,372,852 (the disclosure of which is incorporated herein by reference), and further information on carbon scavengers can be found in U.S. Pat. No. 3,494,020 (the disclosure of which is likewise incorporated herein by reference).

The tape of this invention departs from the prior art and attains improved resistance to degradation during preheating by virtue of a layer of heat-curable adhesive on the exposed surface of the flexible refractory material and preferably also incorporates a monolayer of glass cullet or other inorganic particles on the exposed surface of the adhesive layer.

The heat-curable adhesive used in this invention can be formed of numerous materials which are in a solvent-free state at room temperatures, such as 150°C., will heat cure to provide a continuous layer of resin across the top of the flexible refractory. This layer will hold the inorganic particles of the flexible refractory in position. One adhesive which fits the requirements of this invention is a blend of nitrile, rubber and a thermosetting resin system at least ½ to ⅓ the weight of the resin system constituting a liquid epoxy resin. The liquid epoxy resin should be at least slowly pourable at room temperature and may contain in addition to the pourable epoxy resin, a reactive phenol formaldehyde resin, a resorcinol formaldehyde resin or other thermosetting materials which are compatible with nitrile rubber and the pourable epoxy of the cure temperature. The resin system will contain means for curing the resins present, for example, where phenolic resin is present in substantial amounts the epoxy present will react with phenolic and no further curing agent will be necessary. However, if the entire system consists essentially of epoxy, a separate curing agent effective at the elevated curing temperature, e.g., 150°C. is included. The curing agent chosen should have little effect at room temperature so that the epoxy resin nitrile rubber blend has a long shelf life at room temperature. One example of such a curing agent is a dicyandiamide. The resins present are preferably mutually soluble and compatible at room temperatures; however, it is essential that they be mutually soluble at the cure temperature to insure an intimate reaction between the various ingredients present. Further information dealing with percentages or rubber, types of epoxy, equivalents and curing agents can be found in U.S. letters Pat. No. 3,326,741 issued June 20, 1967 to Olson (the disclosure of which is incorporated herein by reference).

The welding tape of this invention is placed at the back of the joint to be welded prior to preheating. As the joint is heated, typically at 150° to 175°C. for 1 hour, the heat-hardening adhesive layer cures to form a thin continuous film material which holds the refractory particles in position.

A top coating of glass cullet or other inorganic particles, e.g., metal oxide spheres or pieces, can be disposed as a monolayer of particles on the heat-curable adhesive. The top coating protects the tacky heat-hardenable adhesive and permits easy rolling and unrolling of the tape. The particles form a smooth glaze during welding, imparting a fine finish to the weld. They also space the organic materials of the tape away from the weld, reducing the possibility that any carbon will be absorbed by the weld metal.

The inorganic particles will generally be about 10 to 60 mesh (0.25–1.6 mm.) in size. Particles larger than about 10 mesh (1.6 mm.) are difficult to adhere to the tape and particles smaller than about 60 mesh (0.25 mm.) provide minimal spacing between the carbon caused by decomposition of the tape in the presence of the molten weld material. A more preferred size range is about 20–40 mesh (0.4–0.8 mm.), particles of this size being easily adhered to the heat-curable adhesive layer and providing adequate spacing between the weld metal and refractory material. Where small particles or no particles are used, a carbon scavenger can be added to the heat-curable adhesive layer to prevent carbon transfer to the weld material.

BRIEF DESCRIPTION OF THE DRAWING

A further understanding may be had by referring to the accompanying drawing in which:

FIG. 1 is a cross-sectional view of one embodiment of the tape of this invention; and FIG. 2 is a cross-sectional view of a joint, prior to welding, showing the tape of FIG. 1 in position.

DETAILED DESCRIPTION OF THE PREFERRED EMBODIMENTS

Composite tape 10 comprises backing 11 coated on one side with pressure-sensitive adhesive 12, which is protected by removable release liner 13. A self-supporting flexible strip of refractory material 14 is disposed medially along the length of the tape. A layer of a tacky, heat-curable resin 16 is disposed on the surface of refractory material 14 opposite backing 11, a monolayer of particulate material 17 being adhered thereover.

FIG. 2 shows two pieces of metal 18 in position to be joined by welding. The tape 10 is attached to pieces 18 by positioning refractory strip 14 over the gap to be filled and adhering adhesive 12 to the pieces.

A further understanding can be had by referring to the following Example in which all parts and percentages are by weight unless otherwise noted.

EXAMPLE

A pressure-sensitive adhesive was formed by mixing 62.4 parts of 1:3 styrene:butadiene rubber and 37.6 parts of 95.5:4.5 iso-octylacrylate:acrylic acid copolymer.

A latex binder was prepared by mixing 100 parts of a rubber latex (60 percent solids in water); 2 parts of a 2:1 blend of zinc dibutyldithiocarbamate and 2,2′-methylene bis(4-methyl-6-tert butylphenol), 50 percent solids in water; 165 parts of a 55 percent aqueous ammonium nitrate solution; 3 parts sodium sulfonate; 15 parts casein; and 9 parts $NH_4OH$.

A heat hardenable adhesive was made. First, a base was formed by blending 5 parts of "Hycar" 1001× 245 butadine:acrylonitrile copolymer, having a butadiene:acrylonitrile ratio of 57:43 in a Banbury mixer for approximately 1 minute and sheeting the blend on a mill until a smooth homogeneous mixture having a Mooney viscosity of approximately 85–90 was obtained. Five parts of the base was placed in a paddle type churn, 7.5 parts of "Epon" 828, 2.5 parts DER-511, 25 parts fumaric acid curing agent and 19.5 parts methyl ethyl ketone added and the mixture blended to a viscosity of about 5,000–10,000 cps. "Epon" 828 (a trademarked product of Shell Chemical Co.) is a condensation product of epichlorohydrin and bisphenol "A" having a specific gravity of 1.16, an average molecular weight of approximately 340 and an epoxy equivalent of 170 grams per 16 grams of oxirane oxygen. DER-511 (a trademarked product of Dow Chemical Co.) is a brominated epoxy resin having a specific gravity of 1.4, an average molecular weight of appoximately 960 and an epoxy equivalent of 480 grams per 16 grams of oxirane oxygen.

The resultant uniform adhesive composition was coated on a silicone-treated paper liner in an amount sufficient to provide 7.5 dry grains per 24 square inches (31 g/m²). The solvent was evaporated by heating for about 20 minutes in a warm air oven at about 150°F. (65°C.) and a nonwoven web (formed from 60 percent 3 denier rayon fibers, 20 percent 1½ denier rayon fibers) and 20 percent nitrile rubber binder having a thickness of 3–4 mils (75–100 microns) and weighing 5 grains per 24 square inches (21 g/m²) laminated to the tacky surface. The exposed surface of the nonwoven web was then coated with the uniform resin mixture in an amount sufficient to provide a total coating of 15 dry grains per 24 square inches (63 g/m²) and the solvent again evaporated to form a heat-hardenable tacky adhesive film.

A 2-inch (about 5-cm) wide strip of soft aluminum foil 3 mils (about 75 microns) thick was coated on one side with a layer of the pressure-sensitive adhesive about 2 mils (50 microns) thick.

One hundred parts of glass cullet, 150 to 1000 microns in size having an average particles size of about 800 microns, and 5 parts of the latex binder were mixed, cast into a strip 0.25 in. (about 6 mm.) thick × 0.75 inch (about 19 mm.) wide and dried. The resulting flexible refractory strip was adhered to the central portion of the pressure-sensitive adhesive coated aluminum foil, leaving a strip of adhesive along each edge of the tape. The exposed pressure-sensitive adhesive was covered with a strip of treated crepe paper release liner to protect it from contamination.

The tacky, heat-hardenable adhesive film was superposed over the flexible refractory layer and pressed lightly to form a laminated structure.

The exposed tacky adhesive surface was detackified to improve handling properties by dropping glass cullet having a diameter range of about 20 to 40 mesh (0.4–0.8 mm.) onto the heat-hardenable resin and blowing the excess off the strip. The final tape was similar to that shown in FIG. 1 and was surfaced with a monolayer of cullet weighing about 4 grams of cullet per running foot of tape (about 13 grams/meter), corresponding to 4 grams of cullet per 9 square inches.

The tape of this example was placed at the back of a fillet weld joint in ¾ inch (about 19 mm.) thick mild steel plates and the assembly heated to 350°F. (175°C.) for about 1 hour. The plates were welded using conventional arc welding techniques producing sound welds free from inclusions of refractory particles.

What is claimed is:

1. In a welding backup tape of the type in which an elongated heat-resistant flexible tape backing of glass cloth, metal foil or the like is coated with a pressure-sensitive adhesive and provided with, medially adhered along the length thereof, a strip of flexible refractory material comprising refractory particles held together by a flexible binder, the improvement which comprises, disposed on the surface of said refractory strip opposite said backing, a thin tacky layer of film-forming adhesive which is curable when heated to about 150°C. or more for extended periods, and a monolayer of inorganic particles protectively covering the exposed surface of the tacky adhesive layer to permit easy rolling and unrolling of the tape, whereby when said tape is applied over one side of a joint to be welded and preheated to temperatures above about 150°C. the heat hardenable film will retain said refractory particles in position, and said inorganic particles will form a smooth glaze during welding, insuring a smooth, sound weld.

2. The welding tape of claim 1 wherein said inorganic particles are about 0.25 to 1.6 millimeters in diameter.

3. The welding tape of claim 1 wherein said inorganic particles are about 0.4 to 0.8 millimeters in diameter.

* * * * *

UNITED STATES PATENT AND TRADEMARK OFFICE
CERTIFICATE OF CORRECTION

PATENT NO. : 3,929,270
DATED : December 30, 1975
INVENTOR(S) : Roger H. Keith

It is certified that error appears in the above-identified patent and that said Letters Patent are hereby corrected as shown below:

Col. 2, lines 49-50, after "materials which" delete --are in a solvent-free state at room temperatures,-- and insert "at room temperatures in a solvent-free state but which at elevated temperatures".

Col. 2, line 51, delete "will".

Col. 2, line 55, after "One" insert --heat-curable--.

Col. 3, lines 13-14, after "found in",

Col. 4, line 62, "particles" should read --particle--.

Signed and Sealed this

Thirty-first Day of January 1978

[SEAL]

Attest:

RUTH C. MASON
Attesting Officer

LUTRELLE F. PARKER
Acting Commissioner of Patents and Trademarks